(12) United States Patent
Ko

(10) Patent No.: US 10,112,642 B2
(45) Date of Patent: Oct. 30, 2018

(54) STEERING CONTROL APPARATUS AND STEERING CONTROL METHOD

(71) Applicant: MANDO CORPORATION, Pyeongtaek-si, Gyeonggi-do (KR)

(72) Inventor: Sang Jin Ko, Daejeon (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 27 days.

(21) Appl. No.: 15/284,541

(22) Filed: Oct. 4, 2016

(65) Prior Publication Data

US 2017/0096161 A1    Apr. 6, 2017

(30) Foreign Application Priority Data

Oct. 6, 2015  (KR) .......................... 10-2015-0140359

(51) Int. Cl.
*B62D 5/04* (2006.01)
*B62D 3/12* (2006.01)
(Continued)

(52) U.S. Cl.
CPC .............. *B62D 5/046* (2013.01); *B62D 3/12* (2013.01); *B62D 6/008* (2013.01); *B62D 15/024* (2013.01);
(Continued)

(58) Field of Classification Search
CPC ...... B62D 5/046; B62D 3/12; B62D 15/0225; B62D 15/024; B62D 15/025; B60Q 9/00
(Continued)

(56) References Cited

U.S. PATENT DOCUMENTS

| 6,895,317 B2 * | 5/2005 | Yasui ................. B60G 17/0195 180/197 |
| 7,873,453 B2 * | 1/2011 | Kobayashi ........... B62D 5/0463 701/41 |

(Continued)

FOREIGN PATENT DOCUMENTS

| JP | 2003-312512 A | 11/2003 |
| JP | 2006-199219 A | 8/2006 |

OTHER PUBLICATIONS

Machine Translation JP 2003-312512 published Nov. 2003.*
(Continued)

*Primary Examiner* — Anne M Antonucci
*Assistant Examiner* — James E Stroud
(74) *Attorney, Agent, or Firm* — Hauptman Ham, LLP

(57) ABSTRACT

A steering control apparatus, according to an embodiment, may include: a detecting unit configured to detect the angle of a pinion gear that is positioned in the front wheel, a column torque, and a motor current; a frequency estimating unit configured to estimate a road surface frequency that is generated by the road on which the vehicle travels based on at least one of the angle of the pinion gear, the column torque, or the motor current; a rack force estimating unit configured to estimate a rack force based on at least one of the angle of the pinion gear, the column torque, or the motor current; and a control unit configured to extract road surface information that is contained in the rack force based on the road surface frequency and configured to control a steering apparatus based on the road surface information and the rack force.

9 Claims, 11 Drawing Sheets

(51) Int. Cl.
*B62D 15/02* (2006.01)
*B62D 6/00* (2006.01)
*B60Q 9/00* (2006.01)

(52) U.S. Cl.
CPC ....... *B62D 15/025* (2013.01); *B62D 15/0225* (2013.01); *B60Q 9/00* (2013.01)

(58) Field of Classification Search
USPC .......................................................... 701/41
See application file for complete search history.

(56) References Cited

U.S. PATENT DOCUMENTS

| | | | | |
|---|---|---|---|---|
| 8,271,163 | B2* | 9/2012 | Oblizajek | B62D 5/0472 |
| | | | | 180/446 |
| 8,775,040 | B2* | 7/2014 | Noumura | B60W 30/02 |
| | | | | 136/256 |
| 9,327,760 | B2* | 5/2016 | Tamaizumi | B62D 5/0472 |
| 9,415,798 | B2* | 8/2016 | Bolourchi | B62D 5/0463 |
| 9,457,837 | B2* | 10/2016 | Kudo | B62D 6/008 |
| 9,522,586 | B2* | 12/2016 | Lu | B60G 17/0165 |
| 2014/0277946 | A1* | 9/2014 | Oblizajek | B62D 5/0472 |
| | | | | 701/42 |

OTHER PUBLICATIONS

Machine Translation JP 2006-199219 published Aug. 2006.*
Korean Office Action for corresponding Korean Patent Application No. 10-2015-0140359 dated Jul. 1, 2016.

* cited by examiner

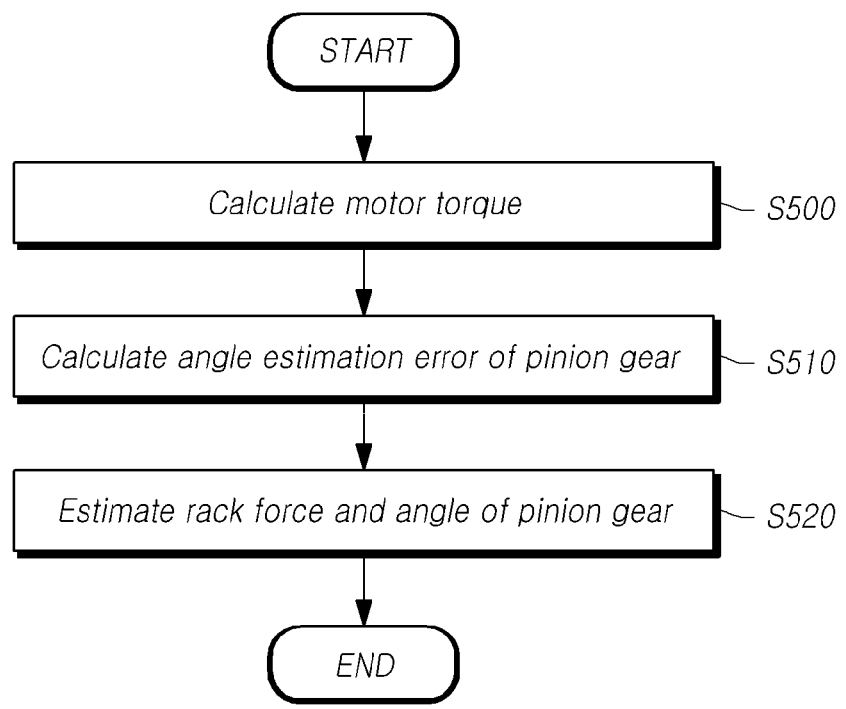

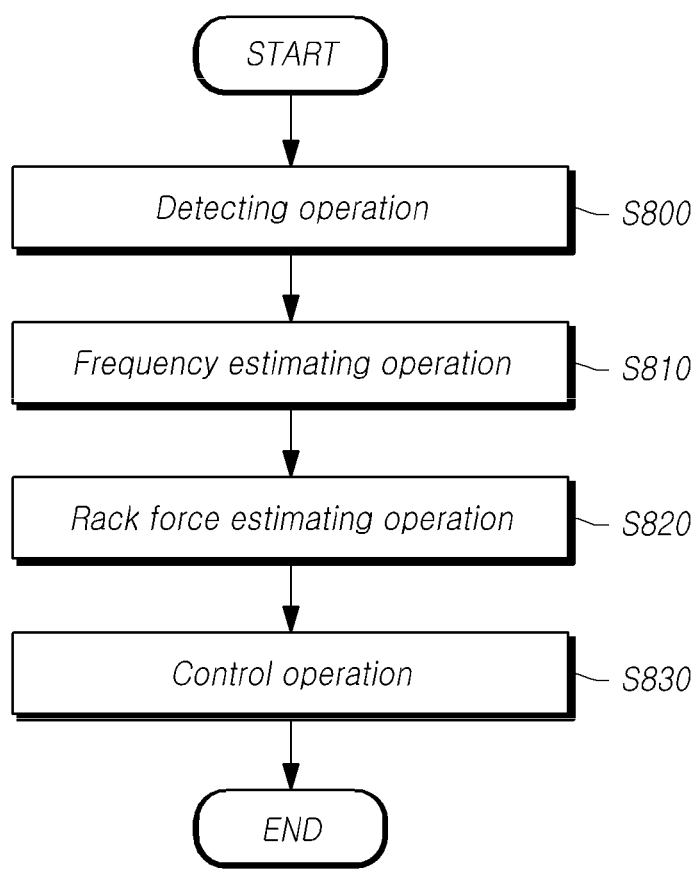

STEERING CONTROL APPARATUS AND STEERING CONTROL METHOD

CROSS REFERENCE TO RELATED APPLICATION

This application claims priority from Korean Patent Application No. 10-2015-0140359, filed on Oct. 6, 2015, which is hereby incorporated by reference for all purposes as if fully set forth herein.

BACKGROUND OF THE INVENTION

1. Field of the invention

The present embodiment relates to a steering control technique.

2. Description of the Prior Art

The steering control apparatus is intended to allow a driver to drive a vehicle in a desired direction by rotating the front wheels.

Such a steering control apparatus uses an EPS as a means for assisting the force that is required to rotate the front wheels.

The force required to rotate the front wheels results from an alignment torque that is generated in the tires, and the alignment torque may be converted to the rack force that is an external force of the steering apparatus.

Therefore, the steering control apparatus calculates the alignment torque or rack force and compensates for the same in order to thereby assist the force required to rotate the front wheels.

However, a typical steering control apparatus cannot compensate for the component of the road surface on which the vehicle travels because of factors, such as the damping caused by a column spring or the inertia of the steering wheel.

SUMMARY OF THE INVENTION

In this background, the object of the present embodiment, according to one aspect, is to provide a steering control apparatus that can provide a driver with a feeling by means of the road surface on which the vehicle travels.

In one aspect, the present invention provides a steering control apparatus that may include: a detecting unit that is configured to detect the angle of a pinion gear that is positioned in the front wheel, a column torque, and a motor current; a frequency estimating unit that is configured to estimate a road surface frequency that is generated by the road on which the vehicle travels based on at least one of the angle of the pinion gear, the column torque, or the motor current; a rack force estimating unit that is configured to estimate a rack force based on at least one of the angle of the pinion gear, the column torque, or the motor current; and a control unit that is configured to extract road surface information that is contained in the rack force based on the road surface frequency and that is configured to control a steering apparatus based on the road surface information and the rack force.

In another aspect, the present invention provides a steering control method that may include: detecting the angle of a pinion gear that is positioned in the front wheel, a column torque, and a motor current; estimating a road surface frequency that is generated by the road on which the vehicle travels based on at least one of the angle of the pinion gear, the column torque, or the motor current; estimating a rack force based on at least one of the angle of the pinion gear, the column torque, or the motor current; and controlling the steering apparatus based on the rack force while further including the road surface frequency.

As described above, the present embodiment may provide a steering control technique that may provide a driver with a feeling by means of the road surface on which the vehicle travels.

BRIEF DESCRIPTION OF THE DRAWINGS

The above and other objects, features, and advantages of the present invention will be more apparent from the following detailed description taken in conjunction with the accompanying drawings, in which:

FIG. 5 is a view illustrating an example for explaining the operation of a rack force estimating unit, according to an embodiment;

FIG. 8 is a flowchart illustrating of a steering control method, according to an embodiment.

DETAILED DESCRIPTION OF THE EXEMPLARY EMBODIMENTS

Figure 1:
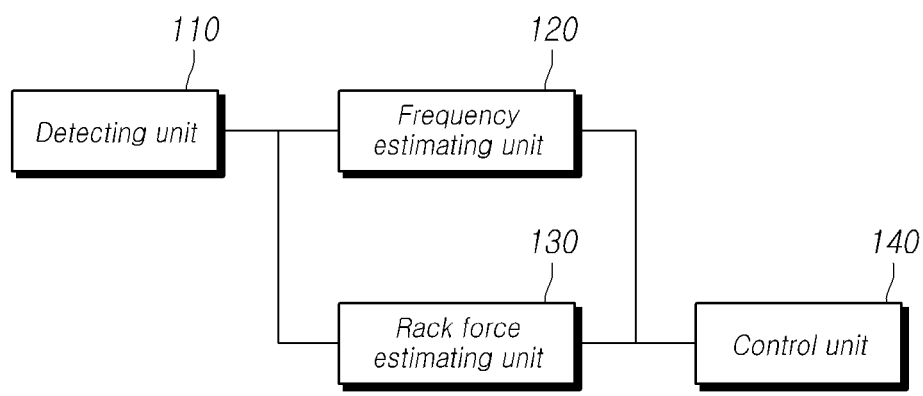
FIG. 1 is a view illustrating a steering control apparatus, according to an embodiment.

Hereinafter, embodiments will be described in detail with reference to the accompanying drawings. In adding reference numerals to elements in each drawing, the same elements will be designated by the same reference numerals, if possible, although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 is a view illustrating a steering control apparatus, according to an embodiment.

Referring to FIG. 1, the steering control apparatus 100, according to an embodiment, may include a detecting unit 110 for detecting the angle of a pinion gear that is positioned in the front wheel, a column torque, and a motor current; a frequency estimating unit 120 for estimating a road surface frequency that is a frequency with respect to the road on which the vehicle travels based on at least one of the angle of the pinion gear, the column torque, or the motor current; a rack force estimating unit 130 for estimating a rack force based on at least one of the angle of the pinion gear, the column torque, or the motor current; and a control unit 140 for extracting road surface information that is contained in the rack force based on the road surface frequency and for controlling a steering apparatus based on the road surface information and the rack force.

The detecting unit 110 of the steering control apparatus 100, according to an embodiment, may detect a specific mark on one of the pinion gears in order to thereby detect the angle of the pinion gear. In addition, the detecting unit 110 may sense a tilt of a torsion bar in order to thereby detect a column torque, and may sense a voltage that is generated by a motor current in order to thereby detect the motor current.

The embodiment described above is only an example, and the present invention is not limited thereto. That is, the detecting unit 110 may detect the angle of the pinion gear, the column torque, or the motor current by using a specific sensor apparatus or a specific method.

The frequency estimating unit 120 of the steering control apparatus 100, according to an embodiment, may estimate a road surface frequency that is generated by the road surface on which the vehicle travels based on at least one of the angle of the pinion gear, the column torque, or the motor current, which is detected by the detecting unit 110. The road surface frequency may be a dominant frequency.

For example, when the vehicle travels on the unpaved road, the vehicle may be confronted with a wobble caused by the unpaved road (hereafter, road surface information). Some of the road surface information may be transferred to the pinion gear, the column, and the motor so that the detecting unit 110 may detect the angle of the pinion gear containing the road surface information, the column torque containing the road surface information, and the motor current containing the road surface information.

In the situation above, the frequency estimating unit 120 may apply at least one of the angle of the pinion gear containing the road surface information, the column torque containing the road surface information, and the motor current containing the road surface information to a low-pass filter (LFP) in order to thereby select at least one of the angle of the pinion gear by the road surface information, the column torque by the road surface information, or the motor current by the road surface information. That is, the low-pass filter may block an angle of the pinion gear, a column torque, and a motor current of other information rather than the angle of the pinion gear by the road surface information, the column torque by the road surface information, or the motor current by the road surface information based on a cut-off frequency. The information above may be separated depending on frequencies.

The cut-off frequency of the above-mentioned low-pass filter may be an approximate value of a road surface frequency, which is pre-calculated by experiments.

Afterwards, by using an active notch filter, the frequency estimating unit 120 may estimate, in real time, a road surface frequency with respect to at least one of the angle of the pinion gear by the road surface information, the column torque by the road surface information, or the motor current by the road surface information, which has been selected.

Meanwhile, the frequency estimating unit 120 may estimate a road surface frequency by using the column torque containing the road surface information. For example, the frequency estimating unit 120 may estimate the road surface frequency that is transferred to the column torque by using change information of the column torque depending on time. More specifically, the frequency estimating unit 120 may identify a change according to the steering wheel operation of the driver and a change according to the transfer of the road surface information by using the change information of the column torque depending on time. For example, the change of the column torque according to the steering wheel operation of the driver may be calculated to be less than 10 Hz, and the change of the column torque according to the transfer of the road surface information may be calculated to be 20 to 30 Hz exceeding 10 Hz. It is due to the fact that the change speed or periodicity according to the steering wheel operation of the driver is lower than the change of the column torque according to the vibration of the road surface.

Therefore, the frequency estimating unit 120 may remove a frequency component that is generated by the steering wheel operation of the driver by using the above-described LFP in order to thereby estimate the road surface frequency.

The rack force estimating unit 130 of the steering control apparatus 100, according to an embodiment, may estimate a rack force that is an external force applied from the vehicle wheels based on the modelling analysis of at least one of the angle of the pinion gear, the column torque, or the motor current, which has been detected by the detecting unit 110.

For example, the rack force estimating unit 130 may: calculate a motor torque based on the motor current that is detected by the detecting unit 110; calculate an angle estimation error of the pinion gear by subtracting the estimated angle of the pinion gear, which is estimated by the rack force estimating unit 130, from the angle of the pinion gear, which is detected by the detecting unit 110; and estimate at least one of the rack force, the estimated angle of the pinion gear, the estimated angular velocity of the pinion gear based on the modelling analysis of the column torque, the motor torque, and the angle estimation error of the pinion gear.

The modelling analysis of the steering control apparatus is performed based on the pinion gear. According to the first modelling analysis that is performed with respect to the portion of the steering manipulation apparatus that does not include the pinion gear, when a drive torque is input to the steering manipulation apparatus, a damping may exist in the steering manipulation apparatus, which absorbs and suppresses the inertia and vibration of the steering manipulation apparatus, and a force may exist, which depends on the difference of angles between the steering manipulation apparatus and the pinion gear by means of a torsion bar that is connected to the axis of the steering manipulation apparatus. That is, the first relational equation may be obtained by means of the first modelling analysis based on the relationship described above.

Similarly, the modelling analysis of the steering control apparatus is performed based on the pinion gear. According to the second modelling analysis that is performed with respect to the motor that includes the pinion gear, a damping may exist, which absorbs and suppresses the vibration between the motor that operates as a motor torque and a belt that connects to a ball screw nut, and the inertia of the ball screw nut and a damping of the ball screw nut may exist. In addition, the gear ratio between the motor and the belt, the gear ratio between the belt and the ball screw nut, and the gear ratio between the rack bar and the pinion gear may be applied to each of them. That is, the second relational equation may be obtained by means of the second modelling analysis based on the relationship described above.

The rack force estimating unit 130 may estimate at least one of the second rack force, the estimated angle of the pinion gear, or the estimated angular velocity of the pinion gear by using the state equation that is calculated based on the first relational equation and the second relational equation by means of the modelling analysis of the steering control apparatus described above. That is, the rack force may be a value that is estimated by applying the modelling analysis.

The control unit 140 of the steering control apparatus 100, according to an embodiment, may extract road surface information that is contained in the rack force that is estimated by the rack force estimating unit 130 based on the road surface frequency that is estimated by the frequency estimating unit 120, and may control the steering apparatus based on the road surface information and the rack force.

For example, the frequency estimating unit 120 may extract the road surface information that is contained in the rack force by using a band pass filter that has a frequency range containing the road surface frequency.

When the steering apparatus is controlled based on only the estimated rack force, some of the road surface information on the travelling road is removed by the column spring or the inertia of the steering wheel so that the driver may have, in part, an undesired feeling, instead of having a desired feeling, while travelling on the road. The desired feeling may refer to a feeling of the road surface information about a specific frequency range of 20 [Hz] to 30 [Hz].

On the contrary, when the steering apparatus is controlled by the control unit 140 based on the road surface information and the rack force, the driver may have a desired feeling by the road surface information without feeling an undesired feeling. That is, the control unit 140 is intended to compensate for some of the road surface information that is removed by the column spring or the inertia of the steering wheel in order to thereby control the steering apparatus.

For example, if the road surface frequency estimated by the frequency estimating unit 120 belongs to the frequency range of 20 [Hz] to 30 [Hz], the control unit 140 may control the steering apparatus so as to reflect the extracted road surface information in order to thereby provide the movement by means of the road surface information to the steering manipulation apparatus.

On the contrary, if the road surface frequency estimated by the frequency estimating unit 120 does not belong to the frequency range of 20 [Hz] to 30 [Hz], the control unit 140 may control the steering apparatus so as not to reflect the extracted road surface information in order to thereby remove the movement by means of the road surface information that is partially provided to the steering manipulation apparatus.

Figure 2:
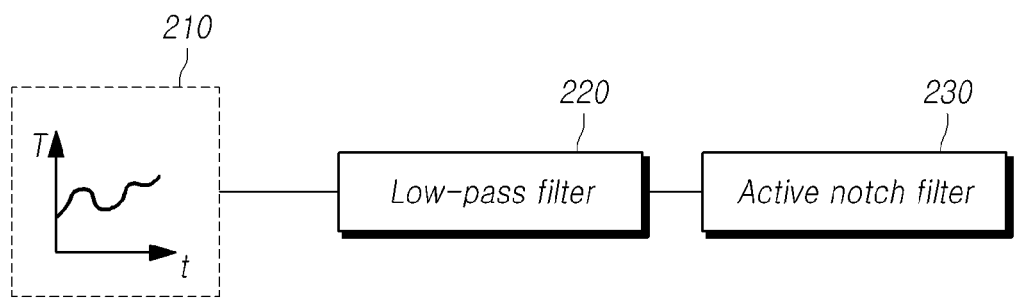
FIG. 2 is a view illustrating a frequency estimating unit, according to an embodiment.

FIG. 2 is a view illustrating a frequency estimating unit, according to an embodiment.

Referring to FIG. 2, the frequency estimating unit, according to an embodiment, may apply a column torque 210 that is detected by the detecting unit to the low-pass filter 220 in order to thereby output only the road surface information.

To this end, a boundary frequency of the low-pass filter 220 may be set to block frequencies (e.g., a frequency that is input by the user) other than the road surface frequency through experiments so that the low-pass filter 220 may output the road surface information of the column torque.

Thereafter, the active notch filter 230 may receive the road surface information of the column torque that is output from the low-pass filter 220 in order to thereby estimate the road surface frequency in real time.

The active notch filter 230 may operate according to Equation 1 below.

$$\begin{cases} z''(t) + 2\zeta\omega(t)z'(t) + \omega(t)^2 z(t) = w(t)^2 d(t) \\ \omega'(t) + \gamma z(t)\{\omega(t)^2 d(t) - 2\zeta\omega(t)z'(t)\} = 0 \end{cases} \quad \text{[Equation 1]}$$

Here, $\Omega(t)$ is an estimated frequency. $\zeta$ and $\gamma$ are greater than zero and are variables that are controlled to offset the conflict between the estimated velocity and the noise sensitivity. $z(t)$ refers to a variable that is defined as $$-\frac{k}{2\zeta}\cos\omega(t),$$

wherein k may mean a peak of a triangular wave that operates as an estimated frequency, and ' may mean a differential. In addition, $[z(t)\ z'(t)]^T$ may be defined as $$\left[ -\frac{\hat{k}}{2\zeta}\ 0\ \omega_0 \right]^T$$

in the initial state. $\hat{k}$ and $\omega_0$ refer to initial state values of k and $\omega(t)$, respectively.

Although the description of FIG. 2 has been made of the embodiment in which the frequency estimating unit estimates a frequency with the input of a column torque, the present invention is not limited thereto, and the frequency estimating unit may estimate a frequency with the input of another factor that is detected in the detecting unit.

Figure 3:
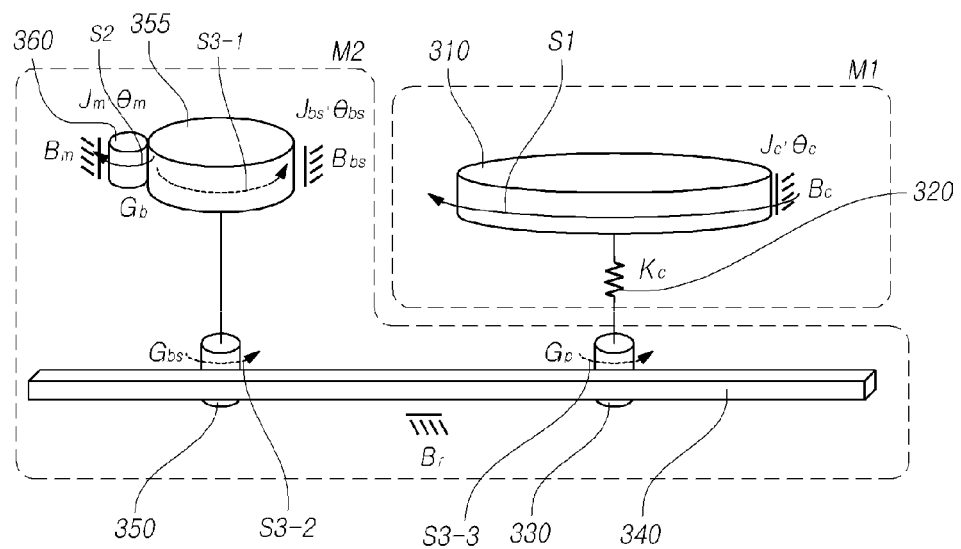
FIG. 3 is a view illustrating an example for explaining a rack force estimating unit, according to an embodiment.

FIG. 3 is a view illustrating an example for explaining a rack force estimating unit, according to an embodiment.

Referring to FIG. 3, the rack force estimating unit may estimate at least one of the rack force, the estimated angle of the pinion gear 330, or the estimated angular velocity of the pinion gear 330 by using the state equation that is calculated based on the first modelling analysis with respect to the portion (M1) of the steering manipulation apparatus 310 that does not include the pinion gear 330 and the second modelling analysis with respect to the portion (M2) of the motor 360 that includes the pinion gear 330.

In the modelling analysis of the portion (M1) of the steering manipulation apparatus 310 that does not include the pinion gear 330, the steering manipulation apparatus 310 may have the rotational angle ($\theta_c$), the inertia ($J_c$), and the damping ($B_c$) according to the movement (S1) of the drive torque ($T_d$), and a constant ($K_c$) by means of a torsion bar and a shock-absorbing apparatus 320 may exist between the steering manipulation apparatus 310 and the pinion gear 330.

The first relational equation showing the relationship of the rotational angle ($\theta_c$), the inertia ($J_c$), the damping ($B_c$), and the constant ($K_c$), which is described above, may be expressed as Equation 2 below.

$$J_c * \theta_c'' = -K_c * (\theta_c - \theta_p) - B_c * \theta_c' + T_d \quad \text{[Equation 2]}$$

Here, $\theta_p$ denotes the angle of the pinion gear 330. $\theta_c'$ refers to the rotational angular velocity, which is the first derivation of $\theta_c$ depending on time, and $\theta_c''$ refers to the rotational angular acceleration, which is the second derivation of $\theta_c$ depending on time.

In addition, according to the modelling analysis of the portion (M2) of the motor 360 that includes the pinion gear 330, the motor 360 may have the rotational angle ($\theta_m$), the inertia ($J_m$), and the damping ($B_m$) according to the movement (S2) of the motor torque ($T_m$) by the motor 360, and ball screw gears 350 and 355 that have the movement (S3-1 and S3-2) by means of a belt that connects the motor 360 and the ball screw gears 350 and 355 may have the rotational angle ($\theta_{bs}$), the inertia ($J_{bs}$), and the damping ($B_{bs}$). The motor 360 and the ball screw gear 355 that are connected by the belt may have a gear ratio ($G_b$), and the ball screw gear 350 and the rack bar 340 that are rotated while being engaged with each other may have a gear ratio ($G_{bs}$). The rack bar 340 and the pinion gear 330 that are rotated while being engaged with each other may have a gear ratio ($G_p$). In addition, the rack bar 340 may have the damping ($B_r$).

The second relational equation showing the relationship of the variables described above may be expressed as Equation 3 below.

$$(J_m+J_{bs})*\theta_p'' = K_c*(\theta_c-\theta_p) - (B_m+B_{bs})*\theta_p' - G_p*F_r + (G_b*G_p/G_{bs})*T_m \quad \text{[Equation 3]}$$

Here, $\theta_p'$ refers to the rotational angular velocity of the pinion gear, which is the first derivation of $\theta_p$ depending on time, and $\theta_p''$ refers to the rotational angular acceleration of the pinion gear, which is the second derivation of $\theta_p$ depending on time.

The inertia ($J_{peq}$) and the damping ($B_{peq}$) of a specific object that is equivalent to the portion (M2) of the motor 360, which is comprised of the motor 360, the ball screw gears 350 and 355, and the pinion gear 330, may be expressed as Equation 4 below.

$$J_{peq}=J_m+J_{bs},\ B_{peq}=B_m+B_{bs} \quad \text{[Equation 4]}$$

Equation 5 may be obtained by applying Equation 4 to Equation 3.

$$J_{peq}*\theta_p''=K_c*(\theta_c-\theta_p)-B_{peq}*\theta_p'-G_p*F_r+(G_b*G_p/G_{bs})*T_m \quad \text{[Equation 5]}$$

Equation 6, which is a state equation that has output variables of the rack force, the rotational angular velocity of the pinion gear, the rotational angular acceleration of the pinion gear, and the first derivation of the rack force, may be obtained based on Equation 2 that is calculated by the modelling analysis of the portion (M1) of the steering manipulation apparatus 310 that does not include the pinion gear 330 and based on Equation 5, which is calculated by the modelling analysis of the portion (M2) of the motor 360 that includes the pinion gear 330. Equation 6 may contain the rack force as the output by converting the same to a state variable.

$$\begin{bmatrix} \theta_p' \\ \theta_p'' \\ F_{rack}' \end{bmatrix} = \begin{bmatrix} 0 & 1 & 0 \\ 0 & -(B_{peq}/J_{peq}) & -(G_p/J_{peq}) \\ 0 & 0 & 0 \end{bmatrix} \begin{bmatrix} \theta_p \\ \theta_p' \\ F_{rack} \end{bmatrix} + \begin{bmatrix} 0 & 0 \\ 1/(J_{peq}) & (G_bG_p)/(J_{peq}G_{bs}) \\ 0 & 0 \end{bmatrix} \begin{bmatrix} T_s \\ T_m \end{bmatrix} \quad \text{[Equation 6]}$$

Here, $T_s$ refers to a column torque that is detected by the torsion bar.

In addition, an estimator for outputting the rack force, the estimated angle of the pinion gear, and the estimated angular velocity by inputting the column torque, the motor torque, and the angle of the pinion gear while applying a feedback structure for compensating for the angle of the pinion gear with the estimated angle of the pinion gear.

$$\hat{x}'=A\hat{x}+Bu+L(y-\hat{y}) \quad \text{[Equation 7]}$$

Here, $$A = \begin{bmatrix} 0 & 1 & 0 \\ 0 & -(B_{peq}/J_{peq}) & -(G_p/J_{peq}) \\ 0 & 0 & 0 \end{bmatrix},$$

$$B = \begin{bmatrix} 0 & 0 \\ 1/(J_{peq}) & (G_bG_p)/(J_{peq}G_{bs}) \\ 0 & 0 \end{bmatrix},$$

$$u = \begin{bmatrix} T_s \\ T_m \end{bmatrix}$$

$$x = \begin{bmatrix} \theta_p' \\ \theta_p'' \\ F_{rack}' \end{bmatrix},\ y = \begin{bmatrix} 1 & 0 & 0 \end{bmatrix} \begin{bmatrix} \theta_p \\ \theta_p' \\ F_{rack}' \end{bmatrix}$$

L is a value that is designed to converge on the error, and $\hat{x}$ refers to estimated x. $\hat{x}'$ refers to estimated x', and $\hat{Y}$ refers to estimated y.

Figure 4:
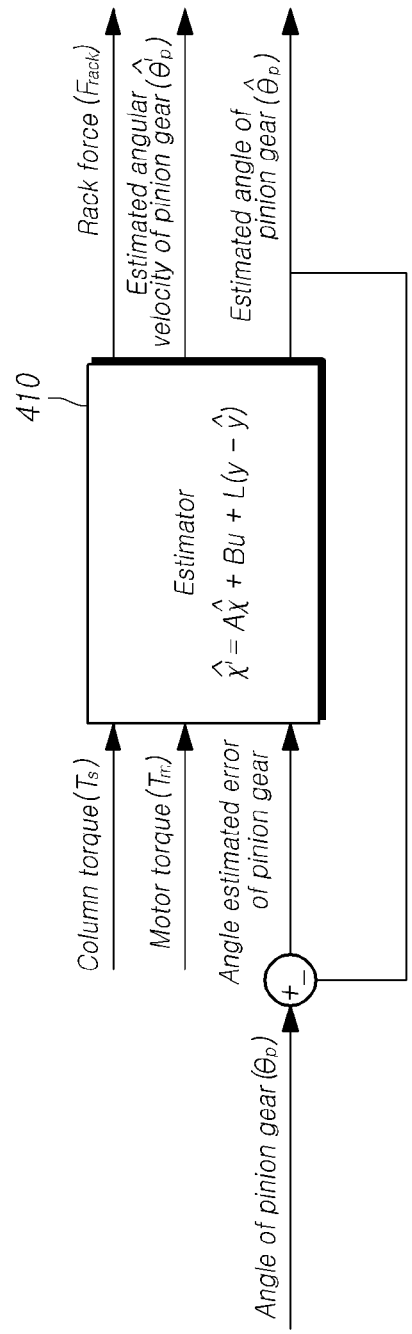
FIG. 4 is a view illustrating another example for explaining a rack force estimating unit, according to an embodiment.

Referring to FIG. 4, the rack force estimating unit may estimate at least one of the rack force, the estimated angle of the pinion gear, or the estimated angular velocity of the pinion gear by applying, to the estimator 410 that is applied with the calculated Equation 7, the motor torque that is calculated based on: a motor current; the estimation error of the angle of the pinion gear, which is calculated by subtracting the estimated angle of the pinion gear from the angle of the pinion gear; and the column torque.

The operation of the rack force estimating unit, according to an embodiment, which has been described based on FIGS. 3 and 4, will be briefly described with reference to FIG. 5.

FIG. 5 is a view illustrating an example for explaining the operation of the rack force estimating unit, according to an embodiment.

Referring to FIG. 5, the rack force estimating unit may calculate a motor torque based on a motor current that is detected by the detecting unit (S500).

In general, the motor generates a constant motor torque according to an input motor current. In operation S500, the motor torque may be calculated by using the motor current that is detected by the detecting unit and by using the motor torque properties depending on the motor current of the motor, which are calculated in advance through experiments.

After calculating the motor torque in operation S500, the rack force estimating unit may calculate an estimation error of the angle of the pinion gear by subtracting the estimated angle of the pinion gear from the angle of the pinion gear that is detected by the detecting unit (S510).

For example, in operation S510, the rack force estimating unit may calculate the estimation error of the angle of the pinion gear by subtracting the estimated angle of the pinion gear, which has been estimated in the previous operation, from the angle of the pinion gear, which has been detected by the detecting unit. That is, the rack force estimating unit may have a feedback structure with respect to the angle of the pinion gear in operation S510.

When operation S510 is performed, the rack force estimating unit may estimate at least one of the rack force, the angle of the pinion gear, or the angular velocity of the pinion gear based on the modelling analysis of the column torque, the motor torque, and the estimation error of the angle of the pinion gear (S520).

In operation S520, at least one of the rack force, the angle of the pinion gear, or the angular velocity of the pinion gear may be estimated by using the estimator that is applied with Equation 7.

Figure 6A:
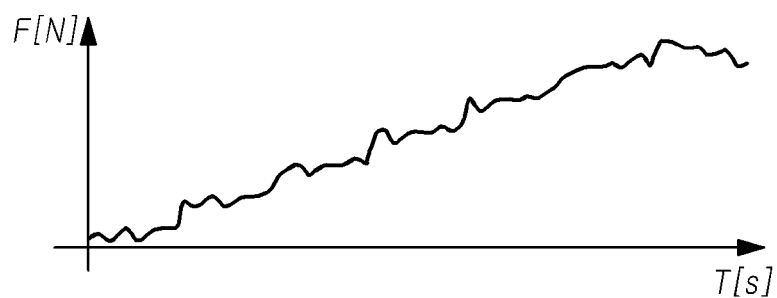
FIGS. 6A and 6B are views illustrating an example for explaining the operation of a control unit, according to an embodiment.
Figure 6B:
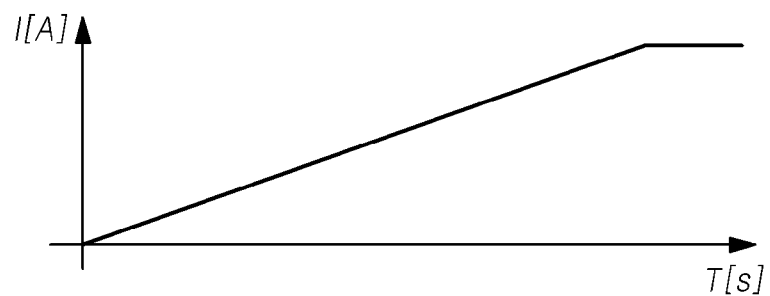

FIGS. 6A and 6B are views illustrating an example for explaining the operation of the control unit, according to an embodiment.

Referring to FIGS. 6A and 6B, if the rack force of the vehicle is estimated as shown in FIG. 6A, the control unit, according to the embodiment, may apply an assist current shown in FIG. 6B to a steering motor based on the estimated rack force in order to thereby control the steering apparatus. That is, the assist current proportional to the rack force is applied to the steering motor in order to thereby compensate for the rack force so that the driver may easily manipulate the steering manipulation apparatus.

However, as shown in the drawing, the typical control unit, according to an embodiment, does not compensate for the road surface information that is contained in the estimated rack force of FIG. 6A. It may be due to the damping caused by the column spring that is positioned between the steering manipulation apparatus and the rack force and may be due to the inertia that exists in the steering manipulation apparatus.

Figure 7A:
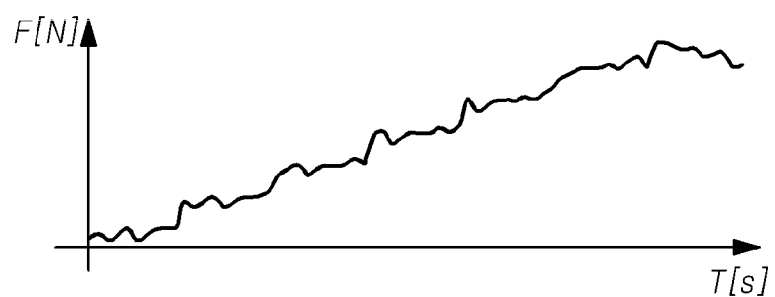
FIGS. 7A, 7B, and 7C are views illustrating an example for explaining the operation of a control unit, according to another embodiment.
Figure 7B:
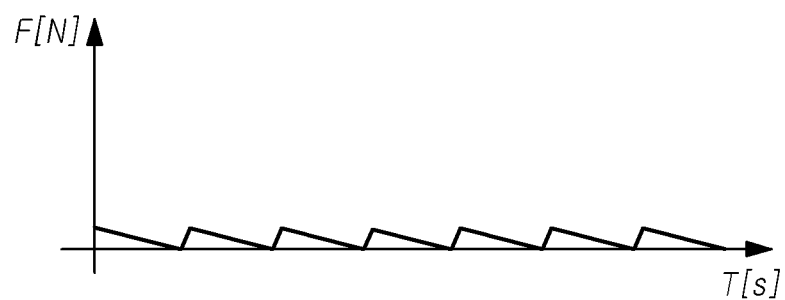
Figure 7C:
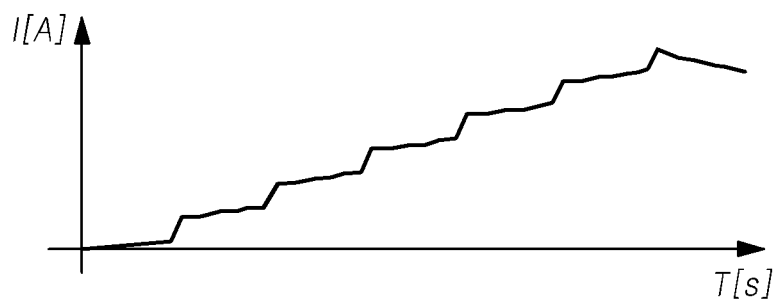

FIGS. 7A, 7B, and 7C are views illustrating an example for explaining the operation of the control unit, according to another embodiment.

Referring to FIGS. 7A, 7B, and 7C, the rack force estimating unit may estimate the rack force of the vehicle as shown in FIG. 7A, and the control unit may estimate the road surface information that is contained in the rack force as shown in FIG. 7B based on the road surface frequency that is estimated by the frequency estimating unit.

In brief, the control unit may estimate the road surface information as shown in FIG. 7B, which is contained in the estimated rack force (FIG. 7A), by using a band pass filter that has a frequency area including the road surface frequency estimated by the frequency estimating unit.

Afterwards, the control unit may apply an assist current as shown in FIG. 7C to the steering motor based on the estimated rack force (FIG. 7A) and based on the estimated road surface information (FIG. 7B) contained in the rack force in order to thereby control the steering apparatus. That is, the assist current proportional to the rack force is applied to the steering motor in order to thereby compensate for the rack force so that the driver may easily manipulate the steering apparatus. In addition, the assist current applied to the steering motor may contain the estimated road surface information (FIG. 7B) so that the driver may have a feeling, such as the vibration caused by the road surface properties.

FIGS. 6A and 6B and FIGS. 7A, 7B, and 7C show examples of the road surface information for a specific frequency range of 20 [Hz] to 30 [Hz], and the operation may be different in other frequencies.

Hereinafter, a steering control method will be briefly described, which is performed by the steering control apparatus that has been described with reference to FIGS. 1 to 7.

FIG. 8 is a flowchart illustrating of a steering control method, according to an embodiment.

Referring to FIG. 8, the steering control method, according to an embodiment, may include: a detecting operation S800 for detecting the angle of the pinion gear that is positioned in the front wheel, a column torque, and a motor current; a frequency estimating operation S810 for estimating the road surface frequency of the travelling road based on at least one of the angle of the pinion gear, the column torque, or the motor current; a rack force estimating operation S820 for estimating a rack force based on at least one of the angle of the pinion gear, the column torque, or the motor current; and a control operation S830 for controlling the steering apparatus by further including the road surface frequency.

In the detecting operation S800, according to an embodiment, the angle of the pinion gear may be detected by detecting a specific mark on one of the pinion gears. In addition, in the detecting operation S800, the column torque may be detected by detecting a tilt of the torsion bar, and the motor current may be detected by detecting the voltage generated by the motor current.

The embodiment described above is only an example, and the present invention is not limited thereto. That is, the angle of the pinion gear, the column torque, or the motor current may be detected by using a certain sensor device or by using a certain method.

In the frequency estimating operation S810 of the steering control method, according to an embodiment, the road surface frequency about the travelling road may be estimated based on at least one of the angle of the pinion gear, the column torque, or the motor current. The road surface frequency may be a dominant frequency.

For example, when the vehicle travels on the unpaved road, the vehicle may be confronted with a wobble caused by the unpaved road (hereafter, road surface information). Some of the road surface information may be transferred to the pinion gear, the column, and the motor so that the angle of the pinion gear, a column torque, and a motor current, which contain the road surface information, may be detected in the detecting operation S800.

In the situation above, in the frequency estimating operation S810, at least one of the angle of the pinion gear, the column torque, and the motor current containing the road surface information may be applied to a low-pass filter (LFP) in order to thereby select at least one of the angle of the pinion gear, the column torque, or the motor current by means of the road surface information. That is, the low-pass filter may block an angle of the pinion gear, a column torque, and a motor current other than the angle of the pinion gear, the column torque, or the motor current by the road surface information based on a cut-off frequency.

The cut-off frequency of the above-mentioned low-pass filter may be an approximate value rather than an exact value, which is calculated through experiments.

Thereafter, in the frequency estimating operation S810, the road surface frequency may be estimated by using an active notch filter with respect to at least one of the angle of the pinion gear, the column torque, or the motor current by means of the selected road surface information.

In the rack force estimating operation S820 of the steering control method, according to an embodiment, the rack force, which is an external force applied from the vehicle wheels, may be estimated based on the modelling analysis of at least one of the angle of the pinion gear, the column torque, or the motor current, which has been detected in the detecting operation S800.

For example, the rack force estimating operation S820 may include: calculating a motor torque based on the motor current that is detected in the detecting operation S800; calculating an angle estimation error of the pinion gear by subtracting the estimated angle of the pinion gear, which is estimated in the rack force estimating operation S820, from the angle of the pinion gear, which is detected in the detecting operation S800; and estimating at least one of the rack force, the estimated angle of the pinion gear, or the estimated angular velocity of the pinion gear based on the modelling analysis of the column torque, the motor torque, and the angle estimation error of the pinion gear.

The modelling analysis of the steering control apparatus is performed based on the pinion gear. According to the first modelling analysis that is performed with respect to the steering manipulation apparatus portion that does not include the pinion gear, when a drive torque is input to the steering manipulation apparatus, a damping may exist in the steering manipulation apparatus, which absorbs and suppresses the inertia and vibration of the steering manipulation apparatus, and a force may exist, which depends on the difference of angles between the steering manipulation apparatus and the pinion gear by means of the torsion bar that is connected to the axis of the steering manipulation apparatus. That is, the first relational equation may be obtained by means of the first modelling analysis based on the relationship described above.

Similarly, the modelling analysis of the steering control apparatus is performed based on the pinion gear. According to the second modelling analysis that is performed with respect to the motor that includes the pinion gear, a damping may exist, which absorbs and suppresses the vibration, between the motor that operates as a motor torque and a belt that connects to a ball screw nut, and the inertia of the ball screw nut and a damping of the ball screw nut may exist. In addition, the gear ratio between the motor and the belt, the gear ratio between the belt and the ball screw nut, and the gear ratio between the rack bar and the pinion gear may be applied to each of them. That is, the second relational equation may be obtained by means of the second modelling analysis based on the relationship described above.

In the rack force estimating operation S820, at least one of the second rack force, the estimated angle of the pinion gear, or the estimated angular velocity of the pinion gear may be estimated by using the state equation that is calculated based on the first relational equation and the second relational equation by means of the modelling analysis of the above-described steering control apparatus. That is, the rack force may be a value that is estimated by applying the modelling analysis.

In the control operation S830 of the steering control method, according to an embodiment, road surface information contained in the rack force that is estimated in the rack force estimating operation S820 based on the road surface frequency that is estimated in the frequency estimating operation S810 may be extracted in order to thereby control the steering apparatus based on the road surface information and the rack force.

When the steering apparatus is controlled based on only the estimated rack force, some of the road surface information on the travelling road may be removed by the column spring or the inertia of the steering wheel so that the driver may have, in part, an undesired feeling, instead of having a desired feeling, while travelling on the road. The desired feeling may refer to a feeling of the road surface information in a specific frequency range of 20 [Hz] to 30 [Hz].

On the contrary, when the steering apparatus is controlled in the control operation S830 based on the road surface information and the rack force, according to an embodiment, the driver may have a desired feeling by the road surface information without an undesired feeling. That is, the control operation S830 may compensate for some of the road surface information that is removed by the column spring or the inertia of the steering wheel in order to thereby control the steering apparatus.

For example, if the road surface frequency that is estimated in the frequency estimating operation S830 belongs to the frequency range of 20 [Hz] to 30 [Hz], the control operation S830 may control the steering apparatus so as to reflect the extracted road surface information in order to thereby provide the movement by means of the road surface information to the steering manipulation apparatus.

On the contrary, if the road surface frequency that is estimated in the frequency estimating operation S810 does not belong to the frequency range of 20 [Hz] to 30 [Hz], the control operation S830 may control the steering apparatus so as not to reflect the extracted road surface information in order to thereby remove the movement by means of the road surface information that is partially provided to the steering manipulation apparatus.

Furthermore, the steering control method may execute operations that are performed by the steering control apparatus that is described based on FIGS. 1 to 7.

Even when all the elements constituting an embodiment of the present invention have been described above as being combined into a single unit or combined to be operated as a single unit, the present invention is not necessarily limited to such an embodiment. That is, at least two elements of all structural elements may be selectively joined and operate without departing from the scope of the present invention. The above embodiments have been described merely for the purpose of illustrating the technical idea of the present invention, and those skilled in the art will appreciate that various modifications and changes are possible without departing from the scope and spirit of the present invention. The scope of protection of the above described embodiments shall be construed on the basis of the appended claims in such a manner that the scope of protection of the embodiments covers all the technical ideas falling within the scope equivalent to the claims.

What is claimed is:

1. A steering control apparatus comprising: a processor configured to detect an angle of a pinion gear that is positioned in a front wheel, a column torque, and a motor current; the processor configured to estimate a road surface frequency that is generated by a road on which a vehicle travels based on at least one of the angle of the pinion gear, the column torque, or the motor current; the processor configured to estimate a rack force based on at least one of the angle of the pinion gear, the column torque, or the motor current; and a control unit configured to extract road surface information that is contained in the rack force based on the road surface frequency, and configured to control a steering apparatus based on the road surface information and the rack force, wherein the frequency estimating unit estimates the road surface frequency that is transferred to the column torque by using change information of the column torque depending on time.

2. The apparatus according to claim 1, wherein the change information of the column torque depending on time contains a frequency component according to a steering wheel operation of a driver and a road surface frequency component that is generated by the road surface, and the processor blocks the frequency component according to the steering wheel operation of the driver by using a predetermined cut-off frequency in order to thereby estimate the road surface frequency.

3. The apparatus according to claim 1, wherein the processor estimates the road surface frequency by using an active notch filter.

4. The apparatus according to claim 1, wherein the control unit extracts the road surface information that is contained in the rack force by using a band pass filter that has a frequency range including the road surface frequency.

5. The apparatus according to claim 1, wherein the control unit controls the steering apparatus so as to reflect the road surface information when the road surface frequency belongs to a specific frequency range.

6. The apparatus according to claim 1, wherein the control unit controls the steering apparatus so as not to reflect the road surface information when the road surface frequency does not belong to a specific frequency range.

7. The apparatus according to claim 1, wherein the processor: calculates a motor torque based on the motor current; calculates an angle estimation error of the pinion gear by using the angle of the pinion gear and the estimated angle of the pinion gear; and estimates at least one of the rack force, the estimated angle of the pinion gear, or the estimated angular velocity of the pinion gear based on the modelling analysis of the column torque, the motor torque, and the angle estimation error of the pinion gear.

8. A steering control method comprising:
detecting an angle of a pinion gear that is positioned in a front wheel, a column torque, and a motor current;
estimating a road surface frequency that is generated by a road on which a vehicle travels based on at least one of the angle of the pinion gear, the column torque, or the motor current;
estimating a rack force based on at least one of the angle of the pinion gear, the column torque, or the motor current;
extracting road surface information that is contained in the rack force based on the road surface frequency; and
controlling a steering apparatus based on the road surface information and the rack force,
wherein the estimating of the frequency comprises estimating the road surface frequency that is transferred to the column torque by using change information of the column torque depending on time.

9. The method according to claim 8, wherein the controlling comprises extracting the road surface information contained in the rack force by using a band pass filter that has a frequency range including the road surface frequency.

* * * * *